(12) United States Patent
Nii et al.

(10) Patent No.: US 10,017,601 B2
(45) Date of Patent: *Jul. 10, 2018

(54) RESIN COMPOSITION, PREPREG AND LAMINATE BOARD

(71) Applicant: Panasonic Intellectual Property Management Co., Ltd., Osaka (JP)

(72) Inventors: Daisuke Nii, Fukushima (JP); Mitsuyoshi Nishino, Fukushima (JP); Fuminori Sato, Fukushima (JP); Yoshihiko Nakamura, Fukushima (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/901,996

(22) PCT Filed: Jun. 24, 2014

(86) PCT No.: PCT/JP2014/003373
§ 371 (c)(1),
(2) Date: Dec. 29, 2015

(87) PCT Pub. No.: WO2015/001764
PCT Pub. Date: Jan. 8, 2015

(65) Prior Publication Data
US 2016/0369042 A1 Dec. 22, 2016

(30) Foreign Application Priority Data
Jul. 4, 2013 (JP) .................. 2013-141117

(51) Int. Cl.
| | |
|---|---|
| *H01B 3/40* | (2006.01) |
| *C08G 59/42* | (2006.01) |
| *C08J 5/24* | (2006.01) |
| *C08K 5/49* | (2006.01) |
| *C08K 9/06* | (2006.01) |
| *C08J 5/10* | (2006.01) |
| *B32B 15/08* | (2006.01) |
| *B32B 27/38* | (2006.01) |
| *B32B 5/02* | (2006.01) |
| *B32B 5/26* | (2006.01) |
| *B32B 15/14* | (2006.01) |
| *B32B 15/20* | (2006.01) |
| *C08K 3/013* | (2018.01) |
| *C08K 5/5399* | (2006.01) |
| *C08K 5/00* | (2006.01) |

(52) U.S. Cl.
CPC ............ *C08G 59/4284* (2013.01); *B32B 5/02* (2013.01); *B32B 5/26* (2013.01); *B32B 15/08* (2013.01); *B32B 15/14* (2013.01); *B32B 15/20* (2013.01); *B32B 27/38* (2013.01); *C08G 59/42* (2013.01); *C08J 5/10* (2013.01); *C08J 5/24* (2013.01); *C08K 3/013* (2018.01); *C08K 5/49* (2013.01); *C08K 9/06* (2013.01); *B32B 2260/021* (2013.01); *B32B 2260/023* (2013.01); *B32B 2260/046* (2013.01); *B32B 2262/101* (2013.01); *B32B 2264/102* (2013.01); *B32B 2307/202* (2013.01); *B32B 2307/306* (2013.01); *B32B 2307/714* (2013.01); *B32B 2307/732* (2013.01); *B32B 2457/08* (2013.01); *C08J 2363/00* (2013.01); *C08K 5/0066* (2013.01); *C08K 5/5399* (2013.01)

(58) Field of Classification Search
CPC ........ C08G 59/42; C08G 59/4284; C08J 5/24; C08J 5/10; C08J 2363/00; C08K 5/49; C08K 9/06; C08K 3/013; C08K 5/5399; C08K 5/0066; B32B 15/08; B32B 27/38; B32B 5/02; B32B 5/26; B32B 15/14; B32B 15/20; B32B 2260/021; B32B 2260/023; B32B 2260/046; B32B 2262/101; B32B 2264/102; B32B 2307/202; B32B 2307/306; B32B 2307/714; B32B 2307/732; B32B 2457/08
USPC ........................................... 523/451
See application file for complete search history.

(56) References Cited

U.S. PATENT DOCUMENTS

| | | | | |
|---|---|---|---|---|
| 3,553,283 A | * | 1/1971 | Doss ..................... | C08G 59/66 215/12.2 |
| 4,379,909 A | * | 4/1983 | Falkenburg ............ | C08G 59/42 525/514 |

(Continued)

FOREIGN PATENT DOCUMENTS

| | | |
|---|---|---|
| CN | 103102643 A | 5/2013 |
| JP | 07-261387 A | 10/1995 |

(Continued)

OTHER PUBLICATIONS

International Search Report and Written Opinion issued in International Application No. PCT/JP2014/003373 dated Jul. 22, 2014, with English translation.

(Continued)

*Primary Examiner* — David T Karst
(74) *Attorney, Agent, or Firm* — McDermott Will & Emery LLP

(57) ABSTRACT

A resin composition contains a preliminary reaction product obtained through mixing an epoxy resin and a monofunctional acid anhydride as a first curing agent in an equivalence ratio of the epoxy resin to the monofunctional acid anhydride in a range of 1:0.1 to 1:0.6, and reacting the epoxy resin and the monofunctional acid anhydride such that a percentage of ring opening of the monofunctional acid anhydride is 80% or more, and a second curing agent being a different compound from the monofunctional acid anhydride.

10 Claims, No Drawings

(56) References Cited

U.S. PATENT DOCUMENTS

| | | | | |
|---|---|---|---|---|
| 6,376,081 B1 * | 4/2002 | Parekh | ............... | C08G 73/02 |
| | | | | 427/385.5 |
| 6,521,354 B1 * | 2/2003 | Shimizu | ............... | C08K 3/36 |
| | | | | 257/786 |
| 6,524,709 B1 * | 2/2003 | Sagara | ............... | C08G 59/304 |
| | | | | 257/E23.077 |
| 2002/0119317 A1 * | 8/2002 | Gan | ............... | C08G 59/304 |
| | | | | 428/413 |
| 2004/0002559 A1 * | 1/2004 | Troutman | ............... | C09D 5/185 |
| | | | | 524/100 |
| 2006/0189721 A1 * | 8/2006 | Akiyama | ............... | C08G 59/621 |
| | | | | 523/400 |
| 2008/0241452 A1 * | 10/2008 | Kondo | ............... | B32B 7/12 |
| | | | | 428/40.1 |
| 2009/0008138 A1 * | 1/2009 | Uchida | ............... | C08G 18/758 |
| | | | | 174/256 |
| 2010/0144926 A1 * | 6/2010 | Tanaka | ............... | C08G 59/226 |
| | | | | 523/400 |
| 2012/0123054 A1 * | 5/2012 | Matsumoto | ............... | C08K 3/0033 |
| | | | | 524/701 |

FOREIGN PATENT DOCUMENTS

| | | |
|---|---|---|
| JP | 09-194610 A | 7/1997 |
| JP | 10-120875 A | 5/1998 |
| JP | 2001-151837 A | 6/2001 |
| JP | 2009-280734 A | 12/2009 |

OTHER PUBLICATIONS

English translation of Chinese Office Action issued in Application No. 201480038019.3 dated May 9, 2016.

* cited by examiner

RESIN COMPOSITION, PREPREG AND LAMINATE BOARD

RELATED APPLICATIONS

This application is the U.S. National Phase under 35 U.S.C. § 371 of International Application No. PCT/JP2014/003373, filed on Jun. 24, 2014, which in turn claims the benefit of Japanese Application No. 2013-141117, filed on Jul. 4, 2013, the disclosures of which are incorporated by reference herein.

TECHNICAL FIELD

The present invention relates to a resin composition, a prepreg, and a laminate board that are used as materials for a printed wiring board.

BACKGROUND ART

Conventionally, improvement in heat resistance, and an increase in flame retardancy of printed wiring boards used in electronics have been achieved by improving a glass transition temperature (Tg) or the like. In recent years, particularly in the field of small electronics such as mobile devices, following the reduction in size and thickness of devices, and an increase in the number of functions of devices, market demand for a further reduction in permittivity and CTE (coefficient of thermal expansion) of printed wiring boards has been increasing. In general, an epoxy resin composition is used as an insulating material for a printed wiring board. In this epoxy resin composition, a phenol-based curing agent, a diamine-based curing agent, a cyanate-based curing agent, an acid anhydride-based curing agent, or the like is used as a curing agent for the epoxy resin. Of these various curing agents, it is known that the acid anhydride-based curing agent is effective in achieving a reduction in permittivity. Conventionally, a polyfunctional acid anhydride-based compound having a plurality of acid anhydride rings in one molecule, styrene-maleic acid copolymer (SMA), or the like has been used as the acid anhydride-based curing agent. For example, Patent Document 1 discloses that a copolymer (SMA) including styrene and maleic anhydride as essential components is used as the acid anhydride-based curing agent.

CITATION LIST

Patent Literature

Patent Document 1: JP H9-194610A

SUMMARY OF INVENTION

However, in the case where the above-described polyfunctional acid anhydride-based compound is used as the curing agent for the epoxy resin, the produced epoxy resin does not sufficiently meet the level of reduced permittivity demanded by the market, and also has inferior adherence such as peel strength. It is also known that SMA is more effective in reducing permittivity than the polyfunctional acid anhydride-based compound, but is problematic in that it has low peel strength.

The present invention has been made in view of the above-described circumstances, and an object of the present invention is to provide a resin composition, a prepreg, and a laminate board which can achieve a high glass transition temperature, a reduced permittivity, and an increased peel strength.

Solution to Problem

As a result of intensive studies in order to resolve the above-described issues, the inventors of the present invention first focused on monofunctional acid anhydride as a curing agent that may achieve a reduction in permittivity. As a result, it was found that in the case where the monofunctional acid anhydride is used as the curing agent for the epoxy resin, a high glass transition temperature can be realized, a reduction in permittivity can be achieved, and the peel strength can be improved. On the other hand, it was also found that, in the process of manufacturing a prepreg through impregnating a base material with a resin composition and drying the resin composition, a portion of the monofunctional acid anhydride volatilizes and is lost, because the monofunctional acid anhydride is volatile due to its relatively small molecular weight. If a portion of the monofunctional acid anhydride volatilizes in this manner, there is a possibility that the component ratio of the resin composition after the prepreg is manufactured will change dramatically from that of the resin composition prior to manufacturing prepreg is manufactured, which may cause a bad effect on the characteristics of the printed wiring board. In view of this, the inventors of the present invention conducted further studies, and as a result, accomplished the present invention as follows.

A resin composition according to the present invention, contains:

a preliminary reaction product obtained through mixing an epoxy resin and a monofunctional acid anhydride as a first curing agent in an equivalence ratio of the epoxy resin to the monofunctional acid anhydride in a range of 1:0.1 to 1:0.6, and reacting the epoxy resin and the monofunctional acid anhydride such that a percentage of ring opening of the monofunctional acid anhydride is 80% or more; and a second curing agent being a different compound from the monofunctional acid anhydride.

In the resin composition, it is preferable that the second curing agent be at least one selected from the group consisting of a polyfunctional acid anhydride, a styrene-maleic anhydride resin, an amine-based curing agent, a thiol-based curing agent, a cyanate-based curing agent, an active ester-based curing agent, and a phenol-based curing agent.

It is preferable that the resin composition further contain a phosphorus-containing flame retardant, a phosphorus content of a total amount of an organic component and the phosphorus-containing flame retardant in the resin composition be 1.0 mass % or more, and at least a portion of the phosphorus-containing flame retardant have a functional group reactive with an acid anhydride group or a carboxy group.

It is preferable that the resin composition further contain an inorganic filler, and a content of the inorganic filler be 5 to 50 parts by mass with respect to 100 parts by mass of a remaining portion of the resin composition that excludes the inorganic filler.

In the resin composition, it is preferable that a surface treatment be performed on the inorganic filler. In this case, it is preferable to use, as the inorganic filler, an inorganic filler on which a surface treatment is performed with a silane coupling agent in advance. Alternatively, a silane coupling agent may be further mixed in the resin composition such that a surface treatment is performed on the inorganic filler with the silane coupling agent in the resin composition. In the case where the silane coupling agent is mixed in the resin composition, it is preferable that the content of the silane coupling agent be 1 to 10 parts by mass with respect to 100 parts by mass of the inorganic filler.

A prepreg according to the present invention is formed through impregnating a base material with the resin composition, and semi-curing the resin composition.

A laminate board according to the present invention is formed through laminating the prepreg with a metal foil, and hot-press molding the laminated prepreg.

Advantageous Effects of Invention

According to the present invention, the greater part of the monofunctional acid anhydride is preliminarily reacted with the epoxy resin, and thus the volatilization of the monofunctional acid anhydride is suppressed, and the monofunctional acid anhydride can be surely incorporated in the curing reaction system of the epoxy resin. In addition, the monofunctional acid anhydride as the first curing agent and the second curing agent are used in combination as components of the curing agent, and therefore a high glass transition temperature can be realized and a reduction in permittivity and increase in peel strength can be achieved.

DESCRIPTION OF EMBODIMENTS

Hereinafter, an embodiment of the present invention will be described.

A resin composition according to the embodiment of the present invention contains an epoxy resin and a curing agent.

There is no particular limitation on the epoxy resin as long as the epoxy resin is bifunctional or polyfunctional, and examples thereof include dicyclopentadiene epoxy resins, phosphorus-containing epoxy resins, naphthalene epoxy resins, bisphenol A epoxy resins, bisphenol F epoxy resins, phenol novolac epoxy resins, cresol novolac epoxy resins, bisphenol A novolac epoxy resins, biphenyl epoxy resins, alicyclic epoxy resins, polyfunctional phenol diglycidyl ether compounds, and polyfunctional alcohol diglycidyl ether compounds. The above epoxy resins may be used alone or in combination. In particular, if a phosphorus-containing epoxy resin is used, the phosphorus content in the resin composition can be increased, and accordingly, the flame retardancy can be improved.

The resin composition according to the present embodiment contains a first curing agent and a second curing agent as the curing agents. First, the first curing agent will be described, and the second curing agent will then be described.

A monofunctional acid anhydride is used as the first curing agent. The monofunctional acid anhydride is an acid anhydride having one cyclic acid anhydride group (—COOCO—) in one molecule. Examples of the monofunctional acid anhydride include acid anhydride of dicarboxylic acid compound and the like, and specific examples thereof include maleic anhydride, phthalic anhydride, 4-methylhexahydrophthalic anhydride, hexahydrophthalic anhydride, methylbicyclo[2.2.1]heptane-2,3-dicarboxylic anhydride, bicyclo[2.2.1]heptane-2,3-dicarboxylic anhydride, and 1,2,3,6-tetrahydrophthalic anhydride. Furthermore, examples of the monofunctional acid anhydride include acid anhydride of tricarboxylic acid compound and the like, and specifically include trimellitic anhydride. Among these, alicyclic acid anhydrides such as 4-methylhexahydrophthalic anhydride, hexahydrophthalic anhydride, methylbicyclo[2.2.1]heptane-2,3-dicarboxylic anhydride, bicyclo[2.2.1]heptane-2,3-dicarboxylic anhydride, and 1,2,3,6-tetrahydrophthalic anhydride are preferable for achieving a reduction in permittivity. Also, in the present embodiment, if a monofunctional acid anhydride having a boiling point of 150° C. or less, or preferably a monofunctional acid anhydride having a boiling point of 130° C. or less is used, use of the monofunctional acid anhydride that has been preliminarily reacted as described later is particularly effective in effectively suppressing the volatility. Also, the monofunctional acid anhydride as the curing agent has a relatively small molecular weight compared to SMA or the like, and thus is effective in suppressing an increase in the viscosity of varnish. It is preferable to use a monofunctional acid anhydride having a weight-average molecular weight of 400 or less as the curing agent, for example. If such a monofunctional acid anhydride described above is used, compared to a case where a polyfunctional anhydride is used, it is possible to reduce the permittivity (relative permittivity (Dk)) of a cured material and increase the peel strength. The monofunctional acid anhydrides may be used alone or in combination.

In the resin composition according to the present embodiment, the epoxy resin and the monofunctional acid anhydride are reacted in advance to produce a reaction product, and the resulting product is used as a preliminary reaction product.

For preparing the preliminary reaction product, the epoxy resin and the monofunctional acid anhydride are mixed in an equivalence ratio of the epoxy resin to the monofunctional acid anhydride in a range of 1:0.1 to 1:0.6. If the monofunctional acid anhydride is less than 0.1 equivalents per equivalent of the epoxy resin, there is a concern that a high glass transition temperature cannot be realized, or the peel strength cannot be increased. Also, there is a concern that a sufficient reduction in permittivity cannot be achieved. If the monofunctional acid anhydride exceeds 0.6 equivalents per equivalent of the epoxy resin, there is a concern that the resin composition will undergo gelation and it will be difficult for a base material to be impregnated with the resin composition, because the reaction rate of the monofunctional acid anhydride in the preliminary reaction is high as will be described later. As a result of which, it will be difficult to manufacture a prepreg.

Moreover, in the preliminary reaction product, the epoxy resin and the monofunctional acid anhydride are reacted such that a percentage of ring opening of the monofunctional acid anhydride is 80% or more (the upper limit is 100%).

The percentage of ring opening of the monofunctional acid anhydride can be calculated as follows, for example. First, at least the epoxy resin and the monofunctional acid anhydride to be preliminarily reacted with each other are mixed and dissolved in a solvent to prepare a varnish (a primary varnish, which will be described later). At this time, although a curing accelerator may be mixed in the above-described varnish, other organic components (a second curing agent, a reactive flame retardant, and the like) that are reactive with the epoxy resin are not mixed in. Next, the infrared absorption spectra of the varnish before and after heating are measured. Then, an area ($A_1$) under a peak caused by a cyclic acid anhydride group near 1800 to 1900 $cm^{-1}$ before heating and an area ($A_2$) thereof after heating are measured, and an area ($B_1$) under a peak caused by a benzene ring near 1500 to 1530 $cm^{-1}$, which is an internal standard peak, before heating and an area ($B_2$) thereof after heating are measured. The areas of these peaks measured in this manner are substituted in the following equation and thus the percentage of ring opening of the monofunctional acid anhydride can be calculated.

The percentage of ring opening (%) of the monofunctional acid anhydride=$\{1-(A_2/B_2)/(A_1/B_1)\}\times 100$ If the percentage of ring opening of the monofunctional acid anhydride is less than 80%, large amount of monofunctional acid anhydrides remain unreacted, which may volatilize and be lost during manufacture of prepregs. As a result, the amount of the curing agent may become insufficient and a crosslink density of a cured material of the resin composition may decrease, and there is a concern that the glass transition temperature (Tg) of the cured material will decrease and the heat resistance will deteriorate, and the peel strength will decrease. The percentage of ring opening of the monofunctional acid anhydride varies in accordance with the heating temperature and the heating time at the time of varnish preparation, and therefore heating conditions are adjusted as appropriate such that the percentage of ring opening reaches 80% or more. These preliminary reaction conditions can be appropriately set by sampling reactants at proper timings and checking the percentage of ring opening thereof while performing a preliminary reaction.

A compound which is reactive with the epoxy resin but is different from the monofunctional acid anhydride is used as the second curing agent. Specifically, it is preferable to use, as the second curing agent, at least one selected from the group consisting of a polyfunctional acid anhydride, a styrene-maleic anhydride resin (SMA), an amine-based curing agent, a thiol-based curing agent, a cyanate-based curing agent, an active ester-based curing agent, and a phenol-based curing agent. Here, the polyfunctional acid anhydride is an acid anhydride having a plurality of acid anhydride groups as the functional group, a specific example being ethylene glycol bisanhydrotrimellitate. Also, the styrene-maleic anhydride resin (SMA) is a copolymer of styrene and maleic anhydride, and there is no particular limitation on the ratio of styrene to maleic acid. Also, a specific example of the amine-based curing agent is dicyandiamide. Also, a specific example of the thiol-based curing agent is pentaerythritol tetrakis(3-mercaptobutyrate). Also, a specific example of the cyanate-based curing agent is a bisphenol A cyanate resin. Due to the above mentioned equivalence ratio between the monofunctional acid anhydride and the epoxy resin, the monofunctional acid anhydride as the first curing agent is insufficient and the epoxy resin would remain in the reaction between the epoxy resin and the monofunctional acid anhydride. However, the remaining epoxy resin caused by the shortfall in the equivalent amount of the first curing agent can be made up for with the second curing agent, and thus undercuring of the resin composition can be prevented. The second curing agents may be used alone or in combination.

As described above, the resin composition contains the preliminary reaction product obtained through the reaction between the epoxy resin and the monofunctional acid anhydride in advance, and the second curing agent. Since the equivalence ratio of the epoxy resin to the monofunctional acid anhydride is in a range of 1:0.1 to 1:0.6, and therefore the preliminary reaction product contains unreacted epoxy resin. "The percentage of ring opening of the monofunctional acid anhydride is 80% or more" indicates that all of the monofunctional acid anhydrides may be reacted, or the preliminary reaction product may contain a minute amount of unreacted monofunctional acid anhydrides.

The resin composition may further contain a flame retardant, a curing accelerator, and the like.

A halogen-based flame retardant and a non-halogen-based flame retardant may be used as the flame retardant. An example of the non-halogen-based flame retardant is phosphorus-containing flame retardant. In the case where the phosphorus-containing flame retardant is used, it is preferable that the phosphorus content of the total amount of an organic component and the phosphorus-containing flame retardant in the resin composition be 1.0 mass % or more in order to achieve good flame retardancy. There is no particular limitation on the upper limit of the phosphorus content. However, if the phosphorus-containing flame retardant is used in an amount exceeding a sufficient amount required to provide the flame retardancy, there is a concern that electrical properties, heat resistance, and the like will decrease. Therefore, it is preferable that the phosphorus content of the total amount of the organic component and the phosphorus-containing flame retardant be 5.0 mass % or less, for example. Moreover, it is preferable that at least some of the phosphorus-containing flame retardant have a functional group reactive with an acid anhydride group or a carboxy group (—COOH). Specifically, it is preferable that the phosphorus-containing flame retardant be a reaction-type phosphorus-containing flame retardant having a functional group reactive with an acid anhydride group or a carboxy group (—COOH). The acid anhydride group in this case is, for example, an acid anhydride group of the unreacted monofunctional acid anhydride. The carboxy group in this case is, for example, a carboxy group resulting from ring-opening of the acid anhydride group of the monofunctional acid anhydride when the epoxy resin reacts with the monofunctional acid anhydride. Therefore, specific examples of the functional group of the reaction-type phosphorus-containing flame retardant include a hydroxy group and an amino group. The monofunctional acid anhydride includes many oxygen atoms, and therefore has a tendency to reduce the flame retardancy of a cured material. However, by reacting a reaction-type phosphorus-containing flame retardant as described above with a monofunctional acid anhydride, phosphorous atoms can be present near oxygen atoms, resulting in the improvement of the flame retardancy. The flame retardants may be used alone or in combination. As long as the effects of the present invention are not impaired, a melting-type phosphorus-containing flame retardant not reactive with the monofunctional acid anhydride, a dispersion-type phosphorus-containing flame retardant not reactive with the monofunctional acid anhydride, or a flame retardant that does not contain phosphorus may be used. The melting-type phosphorus-containing flame retardant dissolves in the resin composition to form a homogeneous system. A specific example thereof is phosphazene. The dispersion-type phosphorus-containing flame retardant does not dissolve in the resin composition and is dispersed to form a heterogeneous system. A specific example thereof is aluminum phosphinate, which is a metal phosphate.

There is no particular limitation on the curing accelerator as long as the curing accelerator can facilitate the reaction between the epoxy resin and the curing agent, and examples thereof include imidazole-based compounds such as 2-ethyl-4-methylimidazole (2E4MZ). As long as the effects of the present invention are not impaired, there is no particular limitation on the content of the curing accelerator.

Furthermore, the resin composition may contain an inorganic filler and the like. Silica such as spherical silica or crushed silica, or a metal hydroxide such as aluminum hydroxide or magnesium hydroxide may be used as the inorganic filler. The content of the inorganic filler can be determined as appropriate taking the balance between a reduction in permittivity and a reduction in CTE into consideration, and is not particularly limited.

Preferably, the content of the inorganic filler is 5 to 50 parts by mass with respect to 100 parts by mass of a remaining portion of the resin composition that excludes the inorganic filler. As a result of the content of the inorganic filler being 5 parts by mass or more, an increase in CTE can be suppressed. As a result of the content of the inorganic filler being 50 parts by mass or less, a reduction in fluidity of the resin composition can be suppressed.

It is preferable that a surface treatment be performed on the inorganic filler with a silane coupling agent in advance. Examples of the silane coupling agent include epoxysilane, isocyanate silane, aminosilane, vinylsilane, methacrylic silane, acrylic silane, ureidosilane, mercaptosilane, sulfide silane, and styrylsilane. The silane coupling agents may be used alone or in combination. In general, the amount of polar groups produced in the reaction between an epoxy resin and an acid anhydride-based curing agent is small. However, even if a small amount of the polar groups is produced, if the surface treatment is performed on the inorganic filler as described above, the inorganic filler and the organic component can be strongly linked to each other by the silane coupling agent, resulting in the improvement of the alkali-resistance of a cured material of the resin composition.

A direct processing method, an integral blending method, or the like may be used as a surface treatment method, for example. The direct processing method is a method of directly processing the inorganic filler with the silane coupling agent in advance, and mixing the inorganic filler that has undergone this surface treatment in a base varnish that will be described later. The integral blending method is a method of adding the silane coupling agent to the base varnish in which the inorganic filler is mixed. The direct processing method is preferable because the direct processing method can more efficiently link the inorganic filler and the organic component, compared to the integral blending method, and can further improve the alkali-resistance of a cured material of the resin composition.

In particular, in the case where the integral blending method is used, the resin composition preferably contains the silane coupling agent in an amount of 1 to 10 parts by mass with respect to 100 parts by mass of the inorganic filler. As a result of the content of the silane coupling agent being 1 parts by mass or more, the alkali-resistance of a cured material of the resin composition can be further improved. As a result of the content of the silane coupling agent being 10 parts by mass or less, a reduction in the heat resistance can be suppressed.

The resin composition may be prepared as a resin varnish as follows.

First, a varnish (a primary varnish) is prepared in which at least the epoxy resin and the monofunctional acid anhydride to be preliminarily reacted with each other are mixed and dissolved in a solvent. At this time, it is possible to also mix organic components, in the primary varnish, such as the curing accelerator and nonreactive flame retardant that do not directly react with the epoxy resin and the monofunctional acid anhydride, but other organic components reactive with the epoxy resin and the monofunctional acid anhydride (the second curing agent and reactive flame retardant, for example) are not added to the primary varnish and mixed in after a preliminary reaction. Components that are mixed in after the preliminary reaction are referred to as "post-mixing components" hereinafter. The primary varnish is prepared such that the solid content (non-solvent component) concentration of the primary varnish is 60 to 80 mass %, and then is heated at 60 to 80° C. for 1 to 5 hours while the primary varnish is stirred with a stirrer such as a disper to advance the preliminary reaction. Accordingly, the preliminary reaction product obtained by the epoxy resin and the monofunctional acid anhydride being reacted with each other is produced in the primary varnish. Here, as described above, it is better to experimentally find, in advance, a correlation between a heating temperature and a reaction time, which are preliminary reaction conditions, and the percentage of ring opening of the monofunctional acid anhydride through sampling or the like as described above. By doing so, it is possible to achieve the percentage of ring opening of the monofunctional acid anhydride in a reaction product to 80% or more by way of adjusting the above-described preliminary reaction conditions. Note that the above-described heating temperature and heating time are merely examples. A solvent that is not reactive with the epoxy resin and/or the monofunctional acid anhydride can be used as a solvent for preparing a varnish, such as ethers (e.g., ethylene glycol monomethyl ether), ketones (e.g., acetone and methyl ethyl ketone (MEK)), aromatic hydrocarbons (e.g., benzene and toluene) and the like. On the other hand, it is desirable to avoid usage of a solvent having a hydroxyl group, such as alcohol-based solvent, because such a solvent is reactive with acid anhydride. Thereafter, the above-described post-mixing components are added to the primary varnish and extra amount of the solvent is added and mixed as needed, as a result of which a base varnish can be prepared. Note that the base varnish is a varnish obtained by mixing organic components other than an inorganic component such as an inorganic filler.

The base varnish described above can be used as a resin varnish as it is, without mixing therein an inorganic component such as an inorganic filler, to manufacture a prepreg. Alternatively, in a case of mixing an inorganic component, a resin varnish can be prepared through mixing the inorganic component in the base varnish, and uniformalizing the mixture by stirring and blending at 20 to 40° C. for 1 to 3 hours. The inorganic component is the inorganic filler, for example. In this case, the inorganic filler that has undergone the surface treatment may be mixed in the base varnish, based on the direct processing method. Alternatively, the inorganic filler and the silane coupling agent are directly mixed in the base varnish, based on the integral blending method.

In the present embodiment, a prepreg can be manufactured through impregnating a base material such as glass cloth with the resin varnish of the resin composition obtained in the above-described manner, and heating and drying this at 110 to 140° C. to remove the solvent from the resin varnish and semi-cure the resin composition. At this time, the greater part of the monofunctional acid anhydride has been preliminary reacted with the epoxy resin in advance to produce the preliminary reaction product, and therefore even at the time of heating and drying described above, the monofunctional acid anhydride is unlikely to volatilize and the most part of the monofunctional acid anhydride remains in the resin composition in a semi-cured state as the prepreg. It is preferable to perform the above-described heating and drying such that the prepreg has a gel time in a range of 60 to 120 seconds. The gel time of the prepreg is defined as a time duration from a time when a resin composition, which is collected from the prepreg and is in a semi-cured state, is placed on a plate heated to 170° C. to a time when the resin composition is gelated. It is preferable that a resin content (the content of the resin composition) of the prepreg be 30 to 80 mass % with respect to the total amount of the prepreg.

In the present embodiment, a laminate board can be manufactured through laminating the prepreg formed in the above-described manner with a metal foil, and hot-press molding the laminated prepreg. For example, a metal-clad laminate such as a copper clad laminate can be manufactured as the laminate board by a laminate-molding in which a plurality of prepregs are stacked and the metal foil such as a copper foil is placed on the outer side of the stacked prepreg, and hot-pressing is performed thereon. A cured material of the prepreg serves as an insulating layer in the laminate board. By forming the insulating layer as a cured resin layer from the cured material of the resin composition, it is possible to increase the glass transition temperature and improve the heat resistance. Moreover, because the monofunctional acid anhydride is used, it is possible to reduce the permittivity of the insulating layer, improve the adherence of the insulating layer and the metal foil, and increase the peel strength, compared to a case where a polyfunctional acid anhydride is used. Hot-pressing conditions of the above described process are 140 to 200° C. at 0.5 to 5.0 MPa for 40 to 240 minutes, for example.

A printed wiring board can be manufactured through forming a conductive pattern on the laminate board obtained in the above-described manner. For example, the printed wiring board can be manufactured through forming the conductive pattern on the surface of the metal-clad laminate with a subtractive method. Also, a multilayer printed wiring board can be manufactured with the printed wiring boards used as a core material (inner layer material). That is, according to the laminate-molding, after a roughening treatment such as a black oxidation treatment is performed on the conductive pattern (inner layer pattern) of the core material, another metal foil is placed on the surface of this core material with another prepreg interposed therebetween, and hot-pressing is performed thereon. Hot-pressing conditions at this process are also 140 to 200° C. at 0.5 to 5.0 MPa for 40 to 240 minutes, for example. Next, after drilling with drilling processing and a desmear treatment are performed, another conductive pattern (outer layer pattern) is formed with the subtractive method, and a plating treatment is performed on an inner wall of a hole to form a plated through hole, and thus the multilayer printed wiring board can be manufactured. Note that there is no particular limitation on the number of layers of the printed wiring board.

In the printed wiring board, the insulating layer has low permittivity, and therefore when signals are transmitted with the conductive pattern, it is possible to increase the signal speed and process a lot of information at high speed.

Working Examples

Hereinafter, the present invention will be described specifically using working examples.

(Epoxy Resin)

The following were used as the epoxy resin.

"HP-7200HHH", which is a dicyclopentadiene epoxy resin, available from DIC Corporation, (epoxy equivalent: 280 to 290 g/eq, softening point: 100 to 105° C.)

"FX-289-P", which is a phosphorus-containing epoxy resin, available from Nippon Steel & Sumikin Chemical Co., Ltd., (epoxy equivalent: 390 g/eq, phosphorus content: 3.5 wt %)

(Curing Agent)

The following was used as the first curing agent.

"RIKACID MH-700", which is a monofunctional acid anhydride, available from New Japan Chemical Co., Ltd., (4-methylhexahydrophthalic anhydride/hexahydrophthalic anhydride=70/30) (liquid alicyclic acid anhydride, acid anhydride equivalent: 161 to 166 g/eq, neutralization number: 660 to 675 KOH mg/g, freezing point: 20° C.)

The following were used as the second curing agent.

"RIKACID TMEG-S", which is a polyfunctional acid anhydride, available from New Japan Chemical Co., Ltd., (ethylene glycol bis-anhydrotrimellitate) (acid anhydride equivalent: 204 g/eq, softening point: 64 to 76° C.)

"B-4500", which is an alicyclic polyfunctional acid anhydride, available from DIC Corporation, (powder acid anhydride, acid anhydride equivalent: 132 g/eq)

"SMA EF-30", which is a polyfunctional acid anhydride and styrene-maleic anhydride resin, available from CRAY VALLEY, (styrene/maleic anhydride copolymer with styrene:maleic anhydride=3:1, styrene-maleic anhydride resin, neutralization number: 280 KOH mg/g, weight average molecular weight: 9500)

"DICY", which is an amine-based curing agent, available from NIPPON CARBIDE INDUSTRIES CO., INC., (dicyandiamide)

"Karenz MT PE1", which is a thiol-based curing agent, available from Showa Denko K.K., (tetra-functional thiol, pentaerythritol tetrakis(3-mercaptobutyrate), molecular weight: 544.8)

"BADCy", which is a cyanate-based curing agent, available from LONZA, (bisphenol A cyanate ester)

"EXB-9485", which is an active ester-based curing agent, available from DIC Corporation "TD-2090", which is a phenol-based curing agent, available from DIC Corporation (Flame Retardant)

The following were used as the flame retardant.

"SPB-100", which is a melting-type phosphorus-containing flame retardant, available from Otsuka Chemical Co., Ltd., (phosphazene, phosphorus content: 13 wt %)

"OP-935", which is a dispersion-type phosphorus-containing flame retardant, available from Clariant (Japan) K.K., (aluminum phosphinate, phosphorous content: 23 wt %)

"HPC-9100", which is a reaction-type phosphorus-containing flame retardant, available from DIC Corporation, (phosphorus content: 10 to 11 wt %, softening point: 133 to 147° C.)

"Emerald 2000", which is a reaction-type phosphorus-containing flame retardant, available from Chemtura Japan Limited, (phosphorus content: 9.8 wt %)

(Curing Accelerator)

The following was used as the curing accelerator.

2-ethyl-4-methylimidazole (2E4MZ)

(Inorganic Filler)

The following were used as the inorganic filler.

"Megasil 525", which is a molten crushed silica, available from Sibelco Japan Co., Ltd.

"CL-303M", which is aluminum hydroxide, available from Sumitomo Chemical Co., Ltd.

"Megasil 525 RCS", which is crushed silica treated with epoxysilane, available from Sibelco Japan Co., Ltd., (crushed silica on which a surface treatment has been performed with epoxysilane in advance, D100: <11 μm)

"Megasil 550 RCS", which is crushed silica treated with epoxysilane, available from Sibelco Japan Co., Ltd., (crushed silica on which a surface treatment has been performed with epoxysilane in advance, D100: <6 μm)

"2500-SEJ", which is spherical silica treated with epoxysilane, available from Admatechs Company Limited, (spherical silica on which a surface treatment has been performed with epoxysilane in advance)

"2500-GNO", which is spherical silica treated with isocyanate silane, available from Admatechs Company Limited, (spherical silica on which a surface treatment has been performed with isocyanate silane in advance)

(Silane Coupling Agent)

The following were used as the silane coupling agent.

"KBE-502", which is methacrylic silane, available from Shin-Etsu Chemical Co., Ltd., (3-methacryloxypropylmethyldiethoxysilane)

"KBM-5103", which is acryl silane, available from Shin-Etsu Chemical Co., Ltd., (3-acryloxypropylmethoxysilane)

"KBM-903", which is aminosilane, available from Shin-Etsu Chemical Co., Ltd., (3-aminopropyltrimethoxysilane)

"KBE-585", which is ureidosilane, available from Shin-Etsu Chemical Co., Ltd., (3-ureidopropyltriethoxysilane)

"KBM-802", which is mercaptosilane, available from Shin-Etsu Chemical Co., Ltd., (3-mercaptopropylmethyldimethoxysilane)

"KBE-846", which is sulfide silane, available from Shin-Etsu Chemical Co., Ltd., (bis(triethoxysilylpropyl)tetrasulfide)

"KBM-1003", which is vinylsilane, available from Shin-Etsu Chemical Co., Ltd., (vinyltrimethoxysilane)

"KBM-402", which is epoxysilane, available from Shin-Etsu Chemical Co., Ltd., (3-glycidoxypropylmethyldimethoxysilane)

"KBM-1403", which is styrylsilane, available from Shin-Etsu Chemical Co., Ltd., (p-styryltrimethoxysilane)

"KBE-9007", which is isocyanate silane, available from Shin-Etsu Chemical Co., Ltd., (3-isocyanatepropyltriethoxysilane)

(Resin Composition)

In Working Examples 1 to 34, and Comparative Examples 1 and 2, the above-described epoxy resin, first curing agent (monofunctional acid anhydride), and curing accelerator were mixed based on the composition (parts by mass) shown in Tables 1 to 3, the mixture was diluted with a solvent (MEK) such that the concentration of the solid content (non-solvent component) was 60 to 80 mass %, and the mixture was heated at 60 to 80° C. for 1 to 5 hours while the mixture was stirred with a disper to prepare a primary varnish containing a preliminary reaction product obtained through reacting at least portions of the epoxy resin and the monofunctional acid anhydride reacted with each other. The infrared absorption spectra of the primary varnish before and after heating were measured, and the percentage of ring opening of acid anhydride was calculated. The results are shown in Tables 1 to 3. Furthermore, the second curing agent and the flame retardant were mixed in the above-described primary varnish based on the composition (parts by mass) shown in Tables 1 to 3, and the mixture was uniformalized through stirring and blending to prepare a base varnish.

In Comparative Examples 3 and 4, the above-described epoxy resin, second curing agent, flame retardant, and curing accelerator were mixed based on the composition (parts by mass) shown in Table 2, the mixture was diluted with a solvent (MEK) such that the concentration of the solid content (non-solvent component) was 60 to 80%, and this mixture was uniformalized through mixing and stirring with a disper at 20 to 40° C. for 1 to 3 hours to prepare the base varnish.

Regarding Working Examples 1 to 20 and Comparative Examples 1 to 4, the inorganic filler was mixed in the base varnish based on the composition (parts by mass) shown in Tables 1 and 2, and the mixture was uniformalized through stirring and mixing at 20 to 40° C. for 1 to 3 hours to prepare the resin varnishes. Regarding Working Examples 21 to 30, the resin varnishes were prepared through mixing the inorganic filler and the silane coupling agent in the base varnish based on the composition (parts by mass) shown in Table 3, and uniformalizing the mixture by stirring and blending at 20 to 40° C. for 1 to 3 hours. Regarding Working Examples 31 to 34, the resin varnishes were prepared through mixing the inorganic filler that has undergone the surface treatment in the base varnish based on the composition (parts by mass) shown in Table 3, and uniformalizing the mixture by stirring and blending at 20 to 40° C. for 1 to 3 hours. Note that the resin varnish of Comparative Example 2 was gelated, and thus a prepreg could not be manufactured.

(Prepreg)

A prepreg was manufactured through impregnating glass cloth ("7628 type cloth" available from Nitto Boseki Co., Ltd.), which is a base material, with the resin varnish of the above-described resin composition, heating and drying this at 110 to 140° C. with a noncontact type heating unit, removing the solvent in the resin varnish, and semi-curing the resin composition. The resin content of the prepreg (the content of the resin composition) is 65 to 75 mass % with respect to the total amount of the prepreg.

(Laminate Board)

The laminate board was manufactured as a copper clad laminate through laminate-molding including stacking eight prepregs (340 mm×510 mm) and placing copper foils (ST foil having a thickness of 18 μm, which is available from MITSUI MINING & SMELTING CO., LTD.) on both sides of the stacked prepregs with roughened surfaces being inside, and performing hot-pressing thereon. The above-described hot-pressing conditions were 180° C. at 2.94 MPa for 60 minutes.

(Glass Transition Temperature)

The glass transition temperature of the prepreg was measured with a viscoelastic spectrometer "DMS6100" available from Seiko Instruments Inc. Specifically, the glass transition temperature was measured with a bending module with a frequency of 10 Hz, and a temperature showing a local maximum of tan α obtained when the temperature was increased from room temperature to 280° C. under the condition where a temperature increasing rate is 5° C./minute was used as the glass transition temperature.

(Relative Permittivity (Dk))

The relative permittivity of the copper clad laminate at 1 GHz was measured with an "impedance/material analyzer 4291A" available from Hewlett-Packard Company, in accordance with IPC-TM-650 2.5.5.9.

(Peel Strength)

The strength required in peeling the copper foil from the surface of the copper clad laminate was measured conforming to JIS C 6481. That is, the copper foil was peeled off at a speed of approximately 50 mm/minute, and the strength (kN/m) required in peeling at that time was measured as the peel strength.

(Flame Retardancy)

Similarly to the above-described manner, copper clad laminates having a laminate thickness of 0.8 mm, 1.2 mm, and 1.6 mm were prepared by adjusting the number of prepregs. After the copper foils of the surfaces of the copper clad laminate were removed through etching, a flame retardancy test was performed in accordance with "Test for Flammability of Plastic Materials-UL 94" of Underwriters Laboratories to evaluate the flame retardancy. "OK" indicates a copper clad laminate satisfying V-0, and "NG" indicates a copper clad laminate that does not satisfy V-0. Tables 1 and 2 show the laminate thickness and whether the copper clad laminate having this laminate thickness satisfies V-0.

(Alkali-Resistance)

With regard to Working Examples 1, and 21 to 34, copper clad laminates having a laminate thickness of 0.8 mm were manufactured similarly to the above. After the copper foils of the surfaces of this copper clad laminate was removed, the copper clad laminate was immersed in an aqueous solution of sodium hydroxide (10 mass %) at 70° C. for 30 minutes. Then, a weight loss percentage was calculated from the weights before and after the immersion. The results are shown in Table 3, with the classification below.

"A": weight loss percentage is 0 mass % or more and less than 0.2 mass %

"B": weight loss percentage is 0.2 mass % or more and less than 0.3 mass %

"C": weight loss percentage is 0.3 mass % or more and less than 0.4 mass %

"D": weight loss percentage is 0.4 mass % or more

TABLE 1

| | | Work. Ex. 1 | Work. Ex. 2 | Work. Ex. 3 | Work. Ex. 4 | Work. Ex. 5 | Work. Ex. 6 | Work. Ex. 7 | Work. Ex. 8 | Work. Ex. 9 | Work. Ex. 10 | Work. Ex. 11 | Work. Ex. 12 |
|---|---|---|---|---|---|---|---|---|---|---|---|---|---|
| Whether preliminary reaction is performed | | performed | performed | performed | performed | performed | performed | performed | performed | performed | performed | performed | performed |
| Equivalence ratio of epoxy resin: monofunctional acid anhydride | | 1:0.2 | 1:0.2 | 1:0.1 | 1:0.6 | 1:0.2 | 1:0.2 | 1:0.2 | 1:0.2 | 1:0.2 | 1:0.2 | 1:0.2 | 1:0.2 |
| Percentage of ring opening of acid anhydride | | 100% | 80% | 100% | 100% | 100% | 100% | 100% | 100% | 100% | 100% | 100% | 100% |
| Epoxy resin | HP-7200HHH (DCPD epoxy resin) | 56.95 | 56.95 | 56.95 | 55.28 | 50.14 | 50.47 | 73.87 | 56.50 | 56.95 | 50.14 | 60.00 | 61.46 |
| | FX-289-P (phosphorus-containing epoxy resin) | | | | | | | | | | | | |
| First curing agent | monofunctional acid anhydride RIKACID MH-700 (MeHHPA & HHPA) | 6.53 | 6.53 | 3.26 | 19.01 | 5.75 | 5.78 | 8.46 | 6.48 | 6.53 | 5.75 | 6.88 | 7.05 |
| Second curing agent | polyfunctional acid anhydride RIKACID TMEG-S | | | | | 28.61 | | | | | | | |
| | alicyclic polyfunctional acid anhydride B-4500 | 21.03 | 21.03 | 23.66 | 10.21 | | | | | | | | 22.70 |
| | polyfunctional acid anhydride styrene-maleic anhydride resin SMA EF-30 (styrene/maleic anhydride copolymer) (styrene:maleic anhydride = 3:1) | | | | | | 28.24 | | | | | | |
| | amine-based curing agent DICY | | | | | | | | 2.17 | | | | |
| | thiol-based curing agent Karenz MT PE1 | | | | | | | | 21.52 | | | | |
| | cyanate-based curing agent BADCy | | | | | | | | | 21.03 | | | |
| | active ester-based curing agent EXB-9485 | | | | | | | | | | 28.61 | | |
| | phenol-based curing agent TD-2090 | | | | | | | | | | | 17.62 | |

TABLE 1-continued

|  |  | Work. Ex. 1 | Work. Ex. 2 | Work. Ex. 3 | Work. Ex. 4 | Work. Ex. 5 | Work. Ex. 6 | Work. Ex. 7 | Work. Ex. 8 | Work. Ex. 9 | Work. Ex. 10 | Work. Ex. 11 | Work. Ex. 12 |
|---|---|---|---|---|---|---|---|---|---|---|---|---|---|
| Flame retardant | SPB-100 (melting type) | 15.40 | 15.40 | 15.40 | 15.40 | 15.40 | 15.40 | 15.40 | 15.40 | 15.40 | 15.40 | 15.40 | |
|  | OP-935 (dispersion type) | | | | | | | | | | | | 8.70 |
|  | HPC-9100 (reaction type) | | | | | | | | | | | | |
|  | Emerald 2000 (reaction type) | | | | | | | | | | | | |
| Curing accelerator | 2E4MZ | 0.10 | 0.10 | 0.10 | 0.10 | 0.10 | 0.10 | 0.10 | 0.10 | 0.10 | 0.10 | 0.10 | 0.10 |
| Phosphorus content (mass %) | | 2.0 | 2.0 | 2.0 | 2.0 | 2.0 | 2.0 | 2.0 | 2.0 | 9.0 | 2.0 | 2.0 | 2.0 |
| Inorganic filler | molten crushed silica Megasil 525 | 40.00 | 40.00 | 40.00 | 40.00 | 40.00 | 40.00 | 40.00 | 40.00 | 40.00 | 40.00 | 40.00 | 40.00 |
|  | aluminum hydroxide CL303-M | | | | | | | | | | | | |
| Glass transition temperature (° C.) | | 170 | 165 | 175 | 160 | 150 | 150 | 165 | 165 | 170 | 150 | 165 | 170 |
| Dk (material) | | 3.45 | 3.50 | 3.45 | 3.40 | 3.65 | 3.60 | 3.65 | 3.65 | 3.50 | 3.60 | 3.65 | 3.45 |
| Peel strength (18 μm) (kN/m) | | 0.90 | 0.90 | 0.85 | 1.00 | 0.90 | 0.85 | 1.10 | 1.05 | 0.90 | 0.85 | 1.05 | 0.85 |
| Flame retardancy | | 0.8 mm OK | 0.8 mm OK | 0.8 mm OK | 0.8 mm OK | 1.2 mm OK | 0.8 mm OK | 1.2 mm OK | 1.2 mm OK | 0.8 mm OK | 0.8 mm OK | 1.2 mm OK | 0.8 mm OK |

TABLE 2

|  |  |  | Work. Ex. 13 | Work. Ex. 14 | Work. Ex. 15 | Work. Ex. 16 | Work. Ex. 17 | Work. Ex. 18 | Work. Ex. 19 | Work. Ex. 20 | Comp. Ex. 1 | Comp. Ex. 2 | Comp. Ex. 3 | Comp. Ex. 4 |
|---|---|---|---|---|---|---|---|---|---|---|---|---|---|---|
| Whether preliminary reaction is performed | | | performed | performed | performed | performed | performed | performed | performed | performed | performed | performed | not performed | not performed |
| Equivalence ratio of epoxy resin: monofuntional acid anhydride | | | 1:0.2 | 1:0.2 | 1:0.2 | 1:0.2 | 1:0.2 | 1:0.2 | 1:0.2 | 1:0.2 | 1:0.2 | 1:0.8 | — | — |
| Percentage of ring opening of acid anhydride | | | 100% | 100% | 100% | 100% | 100% | 100% | 1000/0 | 100% | 50% | 100% | — | — |
| Epoxy resin | HP-7200HHH (DCPD epoxy resin) | | 54.48 | 53.57 | 55.26 | 15.14 | 60.45 | 53.57 | 53.57 | 56.95 | 56.95 | 54.49 | 49.32 | 49.73 |
|  | FX-289-P (phosphorus-containing epoxy resin) | | | | | 57.16 | | | | | | | | |
| First curing agent | mono-functional acid anhydride | RIKACID MH-700 (MeHHPA & HHPA) | 6.25 | 6.14 | 6.34 | 6.54 | 6.93 | 6.14 | 6.14 | 6.53 | 6.53 | 24.98 | | |
| Second curing agent | poly-functional acid anhydride | RIKACID TMEG-S | | | | | | | | | | | 35.18 | |
|  | alicyclic poly-functional acid anhydride | B-4500 | 20.12 | 19.78 | 20.41 | 21.06 | 22.32 | 19.78 | 19.78 | 21.03 | 21.03 | 5.03 | | |
|  | poly-functional acid anhydride styrene-maleic anhydride resin | SMA EF-30 (styrene/maleic anhydride copolymer) (styrene:maleic anhydride = 3:1) | | | | | | | | | | | | 34.78 |
|  | amine-based curing agent | DICY | | | | | | | | | | | | |
|  | thiol-based curing agent | Karenz MT PE1 | | | | | | | | | | | | |

TABLE 2-continued

| | | Work. Ex. 13 | Work. Ex. 14 | Work. Ex. 15 | Work. Ex. 16 | Work. Ex. 17 | Work. Ex. 18 | Work. Ex. 19 | Work. Ex. 20 | Comp. Ex. 1 | Comp. Ex. 2 | Comp. Ex. 3 | Comp. Ex. 4 |
|---|---|---|---|---|---|---|---|---|---|---|---|---|---|
| | cyanate-based curing agent BADCy | | | | | | | | | | | | |
| | active ester-based curing agent EXB-9485 | | | | | | | | | | | | |
| | phenol-based curing agent TD-2090 | | | | | | | | | | | | |
| Flame retardant | SPB-100 (melting type) | | | 7.70 | | | | | 15.40 | 15.40 | 15.40 | 15.40 | 15.40 |
| | OP-935 (dispersion type) | | | | | | | | | | | | |
| | HPC-9100 (reaction type) | 19.05 | | | | | | | | | | | |
| | Emerald 2000 (reaction type) | | 20.40 | 10.20 | | 10.20 | 20.40 | 20.40 | | | | | |
| Curing accelerator | 2E4MZ | 0.10 | 0.10 | 0.10 | 0.10 | 0.10 | 0.10 | 0.10 | 0.10 | 0.10 | 0.10 | 0.10 | 0.10 |
| Phosphorus content (mass %) | | 2.0 | 2.0 | 2.0 | 2.0 | 1.0 | 2.0 | 2.0 | 2.0 | 2.0 | 2.0 | 2.0 | 2.0 |
| Inorganic filler | molten crushed silica Megasil 525 | 40.00 | 40.00 | 40.00 | 40.00 | 40.00 | 5.00 | 50.00 | 30.00 | 40.00 | 40.00 | 40.00 | 40.00 |
| | aluminum hydroxide CL303-M | | | | | | | | 10.00 | | | | |
| Glass transition temperature (° C.) | | 175 | 173 | 153 | 160 | 173 | 173 | 173 | 170 | 145 | gelated | 143 | 141 |
| Dk (material) | | 3.48 | 3.48 | 3.60 | 3.55 | 3.45 | 3.40 | 3.50 | 3.65 | 3.65 | | 3.68 | 3.65 |
| Peel strength (18 μm) (kN/m) | | 0.95 | 0.93 | 0.88 | 1.05 | 0.93 | 1.00 | 0.85 | 0.90 | 0.75 | | 0.60 | 0.70 |
| Flame retardancy | | 1.6 mm OK | 1.6 mm OK | 1.6 mm OK | 1.6 mm OK | 1.2 mm OK | 1.6 mm OK | 1.6 mm OK | 1.2 mm OK | 0.8 mm NG | | 0.8 mm OK | 0.8 mm OK |

TABLE 3

| | | Work. Ex. 1 | Work. Ex. 21 | Work. Ex. 22 | Work. Ex. 23 | Work. Ex. 24 | Work. Ex. 25 | Work. Ex. 26 | Work. Ex. 27 | Work. Ex. 28 | Work. Ex. 29 | Work. Ex. 30 | Work. Ex. 31 | Work. Ex. 32 | Work. Ex. 33 | Work. Ex. 34 |
|---|---|---|---|---|---|---|---|---|---|---|---|---|---|---|---|---|
| Whether preliminary reaction is performed | | performed | performed | performed | performed | performed | performed | performed | performed | performed | performed | performed | performed | performed | performed | performed |
| Equivalence ratio of epoxy resin: monofunctional acid anhydride | | 1:0.2 | 10.2 | 1:0.2 | 1:0.2 | 1:0.2 | 1:0.2 | 1:0.2 | 1:0.2 | 1:0.2 | 1:0.2 | 1:0.2 | 1:0.2 | 1:0.2 | 1:0.2 | 1:0.2 |
| Percentage of ring opening of acid anhydride | | 100% | 100% | 100% | 100% | 100% | 100% | 100% | 100% | 100% | 100% | 100% | 100% | 100% | 100% | 100% |
| Epoxy resin | HP-7200HHH (DCPD epoxy resin) | 56.95 | 56.95 | 56.95 | 56.95 | 56.95 | 56.95 | 56.95 | 56.95 | 56.95 | 56.95 | 56.95 | 56.95 | 56.95 | 56.95 | 56.95 |
| First curing agent | monofunctional acid anhydride RIKACID MH-700 (MeHHPA & HHPA) | 6.53 | 6.53 | 6.53 | 6.53 | 6.53 | 6.53 | 6.53 | 6.53 | 6.53 | 6.53 | 6.53 | 6.53 | 6.53 | 6.53 | 6.53 |
| Second curing agent | alicyclic polyfunctional acid anhydride B-4500 | 21.03 | 21.03 | 21.03 | 21.03 | 21.03 | 21.03 | 21.03 | 21.03 | 21.03 | 21.03 | 21.03 | 21.03 | 21.03 | 21.03 | 21.03 |
| Flame retardant | SPB-100 (melting type) | 15.40 | 15.40 | 15.40 | 15.40 | 15.40 | 15.40 | 15.40 | 15.40 | 15.40 | 15.40 | 15.40 | 15.40 | 15.40 | 15.40 | 15.40 |
| Curing accelerator | 2E4MZ | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 |
| Phosphorus content (mass %) | | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Silane coupling agent | methacrylic silane KBE-502 | | 0.8 | | | | | | | | | | | | | |
| | acrylic silane KBM-5103 | | | 0.8 | | | | | | | | | | | | |
| | aminosilane KBM-903 | | | | 0.8 | | | | | | | | | | | |
| | ureidosilane KBE-585 | | | | | 0.8 | | | | | | | | | | |
| | mercaptosilane KBM-802 | | | | | | 0.8 | | | | | | | | | |
| | sulfide silane KBE-846 | | | | | | | 0.8 | | | | | | | | |
| | vinylsilane KBM-1003 | | | | | | | | 0.8 | | | | | | | |
| | epoxysilane KBM-402 | | | | | | | | | 0.8 | | | | | | |
| | styrylsilane KBM-1403 | | | | | | | | | | 0.8 | | | | | |
| | isocyanate silane KBE-9007 | | | | | | | | | | | 0.8 | | | | |

TABLE 3-continued

| | | Work. Ex. 1 | Work. Ex. 21 | Work. Ex. 22 | Work. Ex. 23 | Work. Ex. 24 | Work. Ex. 25 | Work. Ex. 26 | Work. Ex. 27 | Work. Ex. 28 | Work. Ex. 29 | Work. Ex. 30 | Work. Ex. 31 | Work. Ex. 32 | Work. Ex. 33 | Work. Ex. 34 |
|---|---|---|---|---|---|---|---|---|---|---|---|---|---|---|---|---|
| Inorganic filler | molten crushed silica Megasil 525 | 40.00 | 40.00 | 40.00 | 40.00 | 40.00 | 40.00 | 40.00 | 40.00 | 40.00 | 40.00 | 40.00 | | | | |
| | crushed silica treated with epoxysilane Megasil 525 RCS | | | | | | | | | | | | | | 40.00 | |
| | spherical silica treated with epoxysilane Megasil 550 RCS 2500-SEJ | | | | | | | | | | | | | | | 40.00 |
| | spherical silica treated with isocyanate silane 2500-GNO | | | | | | | | | | | | | 40.00 | | |
| Glass transition temperature (° C.) | | 170 | 162 | 162 | 166 | 166 | 166 | 162 | 162 | 162 | 162 | 166 | 166 | 168 | 168 | 168 |
| Dk (material) | | 3.45 | 3.45 | 3.45 | 3.45 | 3.45 | 3.45 | 3.45 | 3.45 | 3.45 | 3.45 | 3.45 | 3.45 | 3.45 | 3.45 | 3.45 |
| Peel strength (18 μm) (kN/m) | | 0.90 | 0.93 | 0.93 | 0.98 | 0.98 | 0.98 | 0.93 | 0.93 | 0.95 | 0.93 | 0.98 | 0.98 | 1.00 | 1.00 | 1.00 |
| Flame retardancy | | 0.8 mm OK | 0.8 mm OK | 0.8 mm OK | 0.8 mm OK | 0.8 mm OK | 0.8 mm OK | 0.8 mm OK | 0.8 mm OK | 0.8 mm OK | 0.8 mm OK | 0.8 mm OK | 0.8 mm OK | 0.8 mm OK | 0.8 mm OK | 0.8 mm OK |
| Alkali-resistance | | D | C | C | B | B | B | C | C | C | C | B | B | A | A | A |

As is clear from Tables 1 to 3, it was confirmed that the working examples all had higher glass transition temperature, lower permittivity, higher peel strength, and higher flame retardancy compared to the comparative examples, and had characteristic at good levels with a good balance.

As is clear from Table 3 in particular, it was confirmed that compared to Working Example 1 in which the inorganic filler that has not undergone the surface treatment was used, Working Examples 21 to 34 in which the inorganic filler that had undergone the surface treatment was used were excellent in alkali-resistance. Moreover, it was confirmed that compared to Working Examples 21 to 30 obtained with the integral blending method, Working Examples 31 to 34 obtained with the direct processing method were particularly excellent in alkali-resistance.

It is inferred that in Comparative Example 1 in which the percentage of ring opening of the monofunctional acid anhydride in the preliminary reaction was as low as 50%, approximately a half portion of the mixed monofunctional acid anhydride remained unreacted, and undercuring occurred due to the volatilization of the monofunctional acid anhydride. It can be thought that because of the above reason, Comparative Example 1 had a low glass transition temperature and low flame retardancy.

In Comparative Example 2 in which a large amount of the monofunctional acid anhydride is mixed in the preliminary reaction, the varnish was gelated, and thus the prepreg could not be manufactured.

Comparative Example 3 in which the polyfunctional acid anhydride was used as the curing agent without using the monofunctional acid anhydride had a low glass transition temperature and a low peel strength.

Comparative Example 4 in which SMA was used as the curing agent without using the monofunctional acid anhydride had low permittivity, which is equivalent to the working examples, but had a low glass transition temperature and a low peel strength.

The invention claimed is:

1. A resin composition comprising:
    a preliminary reaction product obtained through mixing an epoxy resin and a monofunctional acid anhydride as a first curing agent in an equivalence ratio of the epoxy resin to the monofunctional acid anhydride in a range of 1:0.1 to 1:0.6, and reacting the epoxy resin and the monofunctional acid anhydride such that a percentage of ring opening of the monofunctional acid anhydride is 80% or more;
    a second curing agent being a different compound from the monofunctional acid anhydride;
    phosphorus-containing flame retardant; and
    an inorganic filler,
    wherein the second curing agent is at least one selected from the group consisting of a polyfunctional acid anhydride, a styrene-maleic anhydride resin, a thiol-based curing agent, and an active ester-based curing agent,
    wherein the phosphorus-containing flame retardant includes a dispersion-type phosphorus-containing flame retardant that does not dissolve in the resin composition and is not reactive with the monofunctional acid anhydride, and
    wherein a phosphorus content is 1.0 mass % or more and 2.0 mass % or less based on a total amount of the phosphorus-containing flame retardant and organic components in the resin composition,
    wherein the inorganic filler is an inorganic filler surface-treated with a silane coupling agent,
    wherein the silane coupling agent is at least one selected from the group consisting of isocyanate silane, vinylsilane, methacrylic silane, acrylic silane, ureidosilane, mercaptosilane, sulfide silane, and styrylsilane.

2. The resin composition according to claim 1, wherein the phosphorus-containing flame retardant further includes a reaction-type phosphorus-containing flame retardant having a functional group reactive with an acid anhydride group or a carboxy group.

3. The resin composition according to claim 2, wherein the functional group reactive with an acid anhydride group or a carboxy group is a hydroxy group or an amino group.

4. The resin composition according to claim 1,
    wherein a content of the inorganic filler is 5 to 50 parts by mass with respect to 100 parts by mass of a remaining portion of the resin composition that excludes the inorganic filler.

5. The resin composition according to claim 4, wherein a content of the silane coupling agent is 1 to 10 parts by mass with respect to 100 parts by mass of the inorganic filler.

6. A prepreg formed through impregnating a base material with the resin composition according to claim 1, and semi-curing the resin composition.

7. A laminate board formed through laminating the prepreg according to claim 6 with a metal foil, and hot-press molding the laminated prepreg.

8. The resin composition according to claim 1, wherein the second curing agent is at least one selected from the group consisting of a styrene-maleic anhydride resin, a thiol-based curing agent, and an active ester-based curing agent.

9. The resin composition according to claim 1, further comprising:
    a melting-type phosphorus-containing flame retardant that dissolves in the resin composition and is not reactive with the monofunctional acid anhydride.

10. The resin composition according to claim 1, wherein the silane coupling agent is isocyanate silane.

* * * * *